United States Patent
Ben Yahia et al.

(10) Patent No.: US 11,490,094 B2
(45) Date of Patent: Nov. 1, 2022

(54) 360-DEGREE VIDEO STREAMING METHOD AND APPARATUS

(71) Applicant: Orange, Paris (FR)

(72) Inventors: Mariem Ben Yahia, Chatillon (FR); Yannick Le Louedec, Chatillon (FR); Gwendal Simon, Brest (FR); Loutfi Nuaymi, Brest (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/267,415

(22) PCT Filed: Aug. 12, 2019

(86) PCT No.: PCT/FR2019/051918
§ 371 (c)(1),
(2) Date: Feb. 9, 2021

(87) PCT Pub. No.: WO2020/030882
PCT Pub. Date: Feb. 13, 2020

(65) Prior Publication Data
US 2021/0297676 A1    Sep. 23, 2021

(30) Foreign Application Priority Data
Aug. 10, 2018  (FR) ...................................... 1857459

(51) Int. Cl.
*H04N 19/154* (2014.01)
*H04N 19/37* (2014.01)
*G06F 3/01* (2006.01)

(52) U.S. Cl.
CPC ........... *H04N 19/154* (2014.11); *G06F 3/012* (2013.01); *H04N 19/37* (2014.11)

(58) Field of Classification Search
CPC ...... H04N 19/154; H04N 19/37; H04N 19/36; H04N 19/597; H04N 5/23238; G06F 3/012
See application file for complete search history.

(56) References Cited

U.S. PATENT DOCUMENTS

2018/0020204 A1    1/2018  Pang et al.
2019/0310472 A1*  10/2019  Schilt ................. H04N 21/2662
(Continued)

FOREIGN PATENT DOCUMENTS

WO    WO 2017/205794 A1    11/2017

OTHER PUBLICATIONS

International Search Report and Written Opinion dated Feb. 14, 2020 for Application No. PCT/FR2019/051918.
(Continued)

*Primary Examiner* — Maria E Vazquez Colon
(74) *Attorney, Agent, or Firm* — Knobbe, Martens, Olson & Bear, LLP

(57) ABSTRACT

A method for obtaining video chunks of a video sphere for display on a head-mounted display connected to a video server is described, the video chunks being spatially split into a plurality of tiles that can be encoded on at least two different quality levels, including a high quality level and a low quality level, and a display window includes a video sphere portion that is to be displayed at a particular display time. Prior to the display time, the display window is predicted, tiles covering the estimated display window are estimated, and assigned a high quality level, and tiles adjoining those tiles are estimated and assigned a low quality level. A request is sent to a video server to obtain an encoded tile at the associated quality level. The tiles are received from the video server, the display window is
(Continued)

Figure 1:
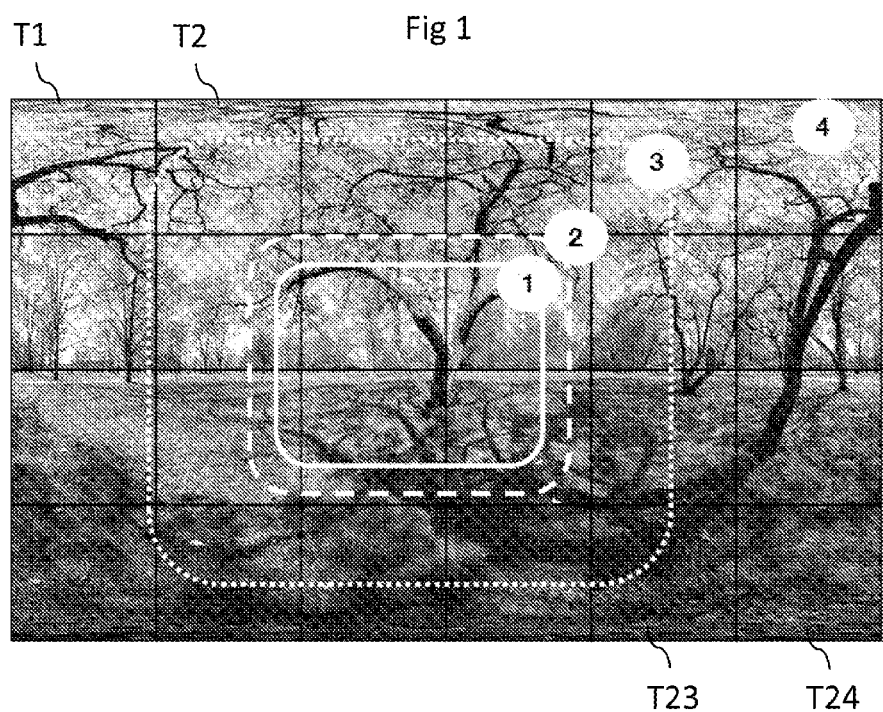

determined, and the tiles corresponding to the determined display window are decoded and displayed.

10 Claims, 2 Drawing Sheets

(56) References Cited

U.S. PATENT DOCUMENTS

2020/0061592 A1* 2/2020 Kamakoti ............ B01J 29/7046
2020/0076867 A1* 3/2020 Han ................ H04N 21/23406
2020/0322696 A1* 10/2020 Dvir .................. H04N 5/23238

OTHER PUBLICATIONS

"Technologies under Consideration for DASH", No. n17812, Jul. 20, 2018 (Jul. 20, 2018), 123. MPEG Meeting; Jul. 16, 2018-Jul. 20, 2018; Ljubljana; (Motion Picture Expert Group or ISO/IEC JTC1/SC29/WG11), Retrieved from the Internet: http://phenix.int-evry.fr/mpeg/doc_end_user/documents/123_Ljubljana/wg1 1/w1 7812.zip [retrieved on Jul. 20, 2018].

Xiao Mengbai et al. "BAS-360°: Exploring Spatial and Temporal Adaptability in 360-degree Videos over HTTP/2" IEEE Infocom 2018—IEEE Conference on Computer Communications, IEEE, Apr. 16, 2018 (Apr. 16, 2018), pp. 953-961 DOI: 10.I 109/INFOCOM.2018.8486390.

* cited by examiner

360-DEGREE VIDEO STREAMING METHOD AND APPARATUS

RELATED APPLICATIONS

This application is the U.S. National Phase of Application No. PCT/FR2019/051918 entitled "360-DEGREE VIDEO STREAMING METHOD AND APPARATUS" and filed Aug. 12, 2019, which claims the benefit of French Patent Application No. 1857459, filed Aug. 10, 2018, each of which is incorporated by reference in its entirety.

1. FIELD OF THE INVENTION

The invention relates to the field of virtual reality, and more particularly that of 360-degree video streaming systems.

2. PRIOR ART

In a 360-degree video streaming system, at any given time the user watches only a portion of the complete spherical video, which is called the video sphere. This portion, which is called the display window, depends on the orientation of the user's head and on the size of the screen in his terminal, which is called a head-mounted display (HMD) or VR headset. To ensure a good quality of experience (also called quality of virtual immersion) and to avoid kinetosis (motion sickness), the user's terminal must constantly adapt the audiovisual content in the display window depending on the movements of the user's head.

A first 360-degree video streaming technique consists in transmitting all the content of the video sphere to the user's terminal. The user's terminal is then responsible locally for extracting from the video sphere the portion to be inserted into the display window of the user's headset. This technique has the drawback of requiring a much greater amount of data than is actually used by the user's terminal to be transported. Specifically, the display window represents only about 15% of the complete video sphere. This problem of consumption of network resources is a major one in the case of 360-degree video since the streaming rate of a complete video sphere may be between several tens and several hundreds of megabits per second.

A second streaming technique aims to mitigate the drawback of the first, i.e. to decrease the amount of data transported. This second technique comprises a plurality of operations.

The first operations take place in the preparation of the video, before its transport through the telecommunications network. The video sphere is firstly projected onto a two-dimensional (2D) plane. Next, it is spatially divided into a plurality of portions called tiles, forming for example a grid of the plane. Next, each tile is encoded independently of the other tiles making up the video. Each tile may thus be decoded independently of the other tiles on the user's terminal. More precisely, each tile is encoded in a plurality of versions corresponding to various quality levels or to various resolutions, at least one high-quality version and at least one low-quality version for example. The video is cut temporally into chunks, per time interval. The duration of the time intervals (and therefore the duration of the chunks) is set for the whole video, and the order of magnitude of this duration is typically one or more seconds. Each chunk is itself composed of successive images, the number of which depends on the number of images per second (or frame rate) of the video, which is 60 for example.

The term tile therefore designates both a spatial and a temporal subdivision of the video sphere. In other words, a tile represents a few moments (1 second for example) of the video in a fraction of the area of the sphere. The following operations are executed in the user's terminal. These operations must be carried out for each of the chunks of the video sphere, during the time interval preceding the display of the chunk. A first operation consists in predicting the orientation that will be given by the user's head to the head-mounted display, during the next time interval, i.e. in predicting the correct display window for the chunk. The second operation consists in requesting and receiving the video content for this chunk and this display window. It should be noted that the display window in the head-mounted display is generally larger than the size of a tile; the display of the display window therefore requires a set of adjacent tiles to be assembled in the user's terminal. The terminal must thus request and receive in high quality the tiles which cover the predicted display window for the next time interval. The terminal must also request and receive in low quality the other tiles (those which are outside the predicted display window but which run the risk of being therein if the prediction is incorrect). These low-quality tiles make it possible to maintain the display, if necessary in low quality, of the video when the user performs very marked and unforeseen head movements (i.e. outside the predicted display window). Specifically, although displaying a low quality in all or some of the display window certainly causes a degradation of the quality of experience of the user, it is preferable to the display of a still image or a black screen. Moreover, these low-quality tiles also allow this second technique to transport, through the network, a smaller amount of data than the first technique described above.

The drawback of this second technique is a degradation of the quality of experience of the user when the prediction is not perfect, as is often the case, for example when he performs a head movement that is very marked and outside the predicted display window.

One of the aims of the invention is to remedy these drawbacks of the prior art.

3. DISCLOSURE OF THE INVENTION

The invention improves the situation using a method for obtaining video chunks of a video sphere for display in a head-mounted display connected to a video server, the video chunks being spatially divided into a plurality of tiles that are encodable with at least two different quality levels, including a high quality level and a low quality level, a portion of the video sphere intended to be displayed at a display time being called a display window, the method comprising, before the display time, at least two iterations of the series of following steps:

estimating the display window, depending on a prediction of a head-mounted-display orientation capable of being adopted at the display time, identifying tiles covering the estimated display window, with which tiles is associated a high quality level, identifying tiles neighboring those covering the estimated display window, with which tiles is associated a low quality level, transmitting, to a video server, for at least one of the identified tiles, a request relating to the obtainment of the encoded tile, the request comprising an indication of the associated quality level, the method furthermore comprising the following steps:

receiving responses to the sent requests, from the video server, comprising encoded tiles, determining the display window at the display time depending on an observed position of the head-mounted display, decoding and displaying the received tiles, corresponding to the determined display window.

Between two display times, the longer it is waited to predict the head-mounted-display orientation likely to be adopted at the next display time, the more accurate this prediction will be. Therefore, the longer the method waits to estimate the next display window, the more accurate this estimate will be because the closer it will be to the next display time, but the less time the method will have to send the requests and receive the required tiles in response. The proposed method makes this compromise unnecessary. Compared to the prior art, in which a single estimate is performed as early as possible for the next display time, the proposed method improves the estimate using at least one second estimate, while guaranteeing the reception of all the necessary tiles. Specifically, if after the second estimate there is not enough time left to request all the necessary tiles again, the first burst of requests guarantees the reception of the missing tiles, even if they are not necessarily all of the quality level corresponding to the second estimate. In addition, the method allows the estimation phase to be iterated a number of times higher than two, within the limit given by the time remaining before the next display time, and by other parameters such as the bandwidth of the connection between the head-mounted display and the video server, the computing power of the head-mounted display, etc.

The duration between two display times is that of a chunk. It will be understood that the expression "display time" designates the time of the start of viewing of a chunk. To predict the orientation of the head-mounted display, various techniques may be used, in combination or independently of one another. Known prediction techniques take into account:

data relating to the head-mounted display, i.e. to its instantaneous orientation and to its trajectory;

data relating to video-chunk content, i.e. indications on particular events, such as noise or light in a viewed video chunk or a video chunk being viewed that is clearly perceptible by the user and that originates from a precise point of the video sphere;

data relating to behavioral statistics specific to a set of users who have viewed the same type of 360-degree video;

data relating to the profile of the user, i.e. data specific to the way in which he consumes the content of this type of 360-degree video.

None of these prediction techniques is perfect, and one of the advantages of the proposed method is that it helps to compensate for inevitable prediction errors, via an innovative strategy for obtaining the tiles.

According to one aspect of the obtaining method, the request further comprises an indication of a priority level associated with the tile.

By virtue of this aspect, it is possible, for example, to prioritize requests for high-quality-level tiles over requests for low-quality-level tiles, or to prioritize requests for which a response has not yet been received over requests for which at least one response has already been received. Thus, the probability is increased that all the necessary tiles will have been received at the display time. In other words, if some tiles are still missing at the display time, it will not be those that are most important to the user, and bandwidth will have been saved between the head-mounted display and the video server.

According to one aspect of the obtaining method, if the iteration is the first, the request is a request to deliver the encoded tile corresponding to the identified tile.

By virtue of this aspect, at least as regards the first estimate of the display window, all the identified tiles are required.

According to one aspect of the obtaining method, if the iteration is not the first and if the quality level or priority level associated with the identified tile has changed with respect to the previous iteration, the request is a request to cancel delivery of the encoded tile corresponding to the identified tile, followed by a new request to deliver the encoded tile, comprising the new quality level or the new priority level associated with the identified tile.

By virtue of this aspect, bandwidth is saved between the head-mounted display and the video server, following the cancellation of requests regarding quality or priority levels that have become non-optimal.

According to one aspect of the obtaining method, if the iteration is not the first and if the quality level associated with the identified tile has decreased with respect to the previous iteration, no new request is sent if the tile has already been received.

By virtue of this aspect, an encoded tile already received with a quality level higher than that required for an identified tile is not requested again, and bandwidth is thus saved between the head-mounted display and the video server.

According to one aspect of the obtaining method, the connection between the head-mounted display and the video server comprises one different stream per identified tile. By virtue of this aspect, it is easy to individually manage the obtainment of the encoded tiles, especially with a view to making modifications to the requests, for example following a change in the quality level or priority level of an identified tile, following an estimate subsequent to the first.

According to one aspect of the obtaining method, the connection between the head-mounted display and the video server uses the HTTP/2 protocol.

HTTP/2 (Hypertext Transfer Protocol, Version 2, which is defined in standard rfc7540), is a protocol that allows, for a given connection, a plurality of streams to be managed, and that in particular allows streams (tiles) to be cancelled during delivery in order, for example, to correct a characteristic or prioritization of the stream (of the tile), without interrupting the connection. It is therefore particularly suitable for the implementation of the proposed method.

The various aspects of the obtaining method that have just been described may be implemented independently of one another or in combination with one another.

The invention also relates to a device for obtaining video chunks of a video sphere for display in a head-mounted display connected to a video server, the video chunks being spatially divided into a plurality of tiles that are encodable with at least two different quality levels, including a high quality level and a low quality level, a portion of the video sphere intended to be displayed at a display time being called a display window, the device comprising a receiver, a transmitter, a decoder, a processor and a memory that is coupled to the processor with instructions that are intended to be executed by the processor with a view to:

estimating the display window, depending on a prediction of a head-mounted-display orientation capable of being adopted at the display time, identifying tiles covering the estimated display window, with which tiles is associated a high quality level, and tiles neighboring those covering the estimated display window, with which tiles is associated a low quality level, transmitting, to a video server, for at least one of the identified tiles, a request relating to the obtainment of the encoded tile, the request comprising an indication of the associated quality level, repeating, at least once before the display time, the estimation, with a view to correcting the identification of the tiles and correcting requests that are still unanswered, receiving responses to the sent requests, from the video server, comprising encoded tiles, determining the display window at the display time depending on an observed position of the head-mounted display, decoding and displaying received tiles, corresponding to the determined display window.

This device, which is able to implement all of the embodiments of the obtaining method that has just been described, is intended to be implemented in a user terminal such as, for example, a head-mounted display.

The invention also relates to a head-mounted display comprising a device according to the above description, a position and movement sensor, and a screen.

More generally, by head-mounted display, what must be understand is any user terminal allowing a user to at least partially view a video sphere.

The invention also relates to a computer program, comprising instructions for carrying out the steps of the method for obtaining data of a video sphere for display in a head-mounted display connected to a video server described above, when this program is executed by a processor.

The invention also relates to a data medium readable by a device included in a head-mounted display, and comprising instructions of a computer program such as mentioned above.

The aforementioned program may use any programming language, and take the form of source code, object code, or of code intermediate between source code and object code, such as code in a partially compiled form, or in any other desirable form.

The aforementioned data medium may be any entity or device capable of storing the program. For example, a medium may include a storage means, such as a ROM, for example a CD-ROM or a microelectronic circuit ROM, or else a magnetic recording means.

Such a storage means may for example be a hard disk, a flash memory, etc. On the other hand, an information medium may be a transmissible medium such as an electrical or optical signal, which may be conveyed via an electrical or optical cable, by radio or by other means. A program according to the invention may in particular be downloaded from an Internet network.

Alternatively, an information medium may be an integrated circuit in which the program is incorporated, the circuit being designed to execute or to be used in the execution of the method in question.

4. PRESENTATION OF THE FIGURES

Figure 3:
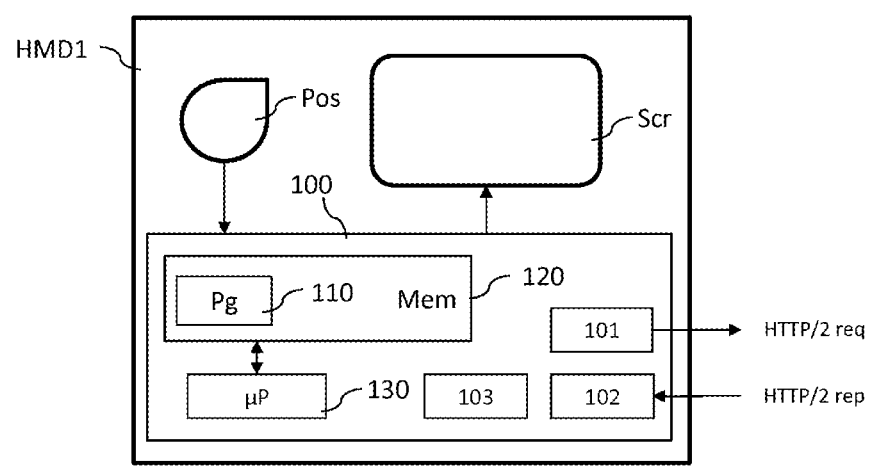
Figure 2:
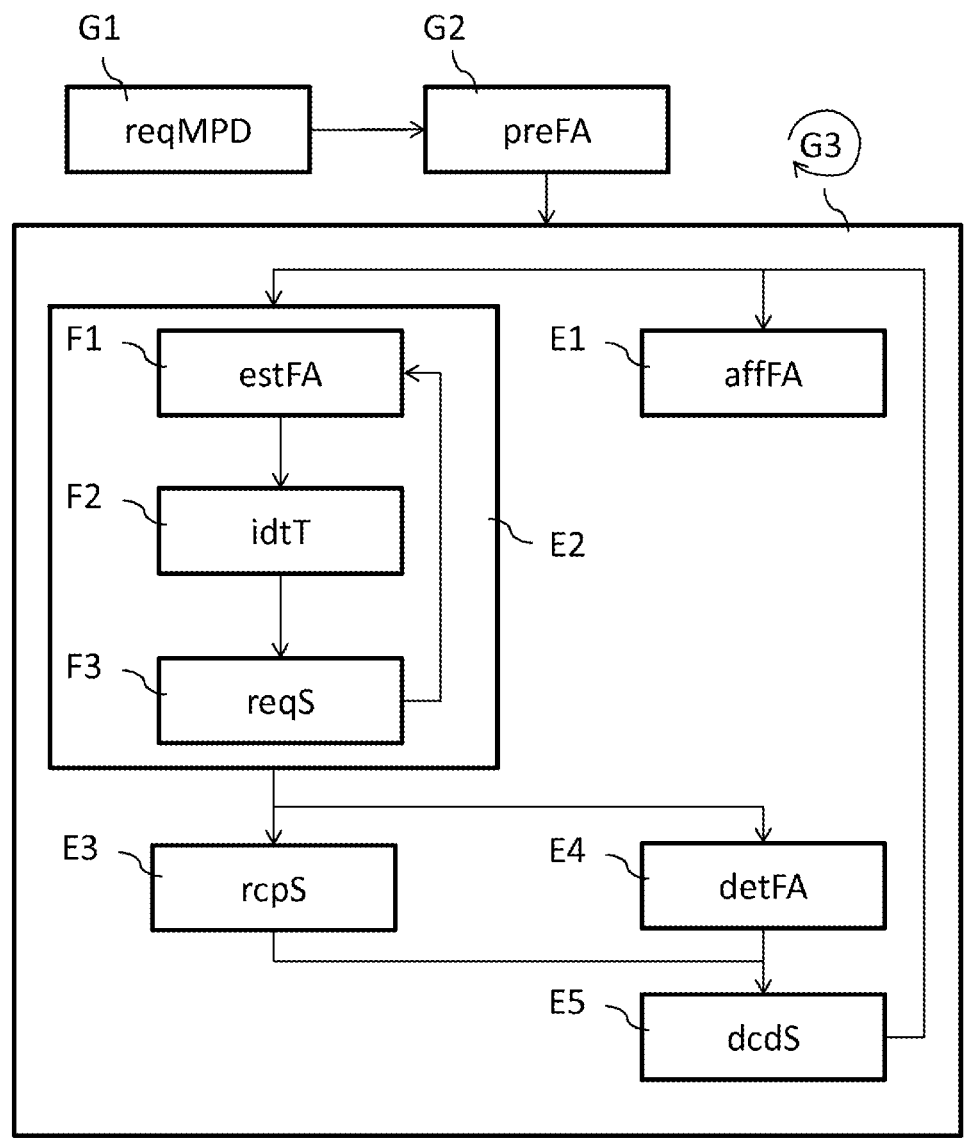

Other advantages and features of the invention will become more clearly apparent from reading the following description of a particular embodiment of the invention, given by way of simple illustrative and non-limiting example, and the appended drawings, in which:

FIG. 1 shows an example of the division of a video sphere into tiles, according to one particular embodiment of the invention, FIG. 2 schematically shows an example of sequencing of the steps of the method for obtaining video chunks, according to one particular embodiment of the invention, FIG. 3 shows an example of a structure of a device for obtaining video chunks, according to one particular aspect of the invention.

5. DETAILED DESCRIPTION OF AT LEAST ONE EMBODIMENT OF THE INVENTION

The embodiment presented below uses a subdivision of a video sphere into 24 tiles, a duration of the video chunks of 1 second, two iterations of prediction of the display window of 500 ms each for each interval between chunks, and the HTTP/2 protocol for the connection between the head-mounted display and the video server, but these choices are merely an indicative and non-limiting exemplary embodiment of the invention. The expression "video sphere" is not limited to a sphere but designates any video only one portion of which may be displayed at any given time, the displayed portion depending on the real or virtual position of the display terminal, or on its orientation, i.e. the direction in which it is pointed, relative to the complete video. The examples described below comprise a head-mounted display, but the invention works with any terminal allowing a user to view a "video sphere".

FIG. 1 shows an example of division of a video sphere into tiles, according to a particular embodiment of the invention.

To generate a 360-degree video, a plurality of conventional videos may be needed to cover the entire video sphere. Preparing the 360-degree video for viewing requires a plurality of operations. Following the assembly into a video sphere of the various conventional videos from which it is composed, said sphere is projected in two dimensions to facilitate its subdivision into the portions called tiles. This subdivision is suitable for streaming and does not necessarily correspond to the video components serving as source to generate the 360-degree video. A common projection is the so-called equirectangular projection, an example of which is illustrated in FIG. 1. In this projection, which is merely an example given by way of indication and non-limitingly, the video sphere is spatially divided into 24 rectangles. To each of the rectangles, at a given display time, corresponds one spatial subdivision of a video chunk, which subdivision is also called a tile. For the sake of convenience, the rectangles are referred to as tiles below. The tiles are numbered T1 to T24. For the sake of clarity, only the tiles T1, T2, T23 and T24 have been indicated, the locations of the other tiles being easily deducible. The tiles may be encoded (compressed) independently of one another with different quality levels, for example using a HEVC encoder video-server end and a corresponding decoder client end, i.e. head-mounted-display end, HEVC being the acronym of High Efficiency Video Coding.

At any given time, only a portion of the video sphere, called the display window, may be watched by the user of the head-mounted display, this making it unnecessary to transmit the complete set of tiles forming the sphere. As the user moves the head-mounted display via his head movements, the exact determination of the display window is a prediction problem, a plurality of solutions to which are known. These solutions require the video sphere to be divided into various regions, depending on the probability of their being in the display window during the next period of display of a video chunk in the head-mounted display.

The example of FIG. 1 uses regions numbered 1 to 4, and represents a prediction of the display window before a given display time:

Region 1 represents an estimate of the display window; portions of this area have a very high probability of being included in the display window Region 2 represents the area of extension of the display window, corresponding to slight natural head movements of the user; portions of this area have a high probability of being included in the display window, Region 3 represents the area of the immediate background, corresponding to the greater movements that occur when/if the user turns his head; portions of this area have a medium probability of being included in the display window, Region 4 represents the area of the far-off background, approximately corresponding to the half of the sphere opposite the display window; portions of this area have a low probability of being included in the display window.

Region 1 touches 6 tiles: tiles T8 to T10, and T14 to T16. Region 2, although slightly larger in area, touches the same 6 tiles: no tiles need to be added compared to region 1. To cover region 3, 10 tiles must be added: tiles T2 to T5, T11, T17, and T20 to T23. Finally, to cover region 4, tiles T1, T6, T7, T12, T13, T18, T19 and T24 must be added. The outer boundaries of a region, relative to the lower ranked region, may be configured in advance. For example, region 2 is configured to be larger than region 1 by 10% along a horizontal axis, and by 5% along a vertical axis. Region 4 for its part has no outer boundaries.

A division into a higher number of regions is possible, but, for the sake of clarity and simplicity, a division into 2 regions is used below. In the indicative and non-limiting embodiment of the invention described below, the division adopted is into two regions corresponding to a region 2 of high probability, and to a region 3 of low probability. In order to be able to display the video content of a region, it will be recalled that the client must retrieve from the server all the tiles touching this region, even if certain tiles are only partially covered (for example tiles T8 and T14 of region 2 in FIG. 1), because the granularity of the encoding is tile-based. In the rest of the description, since region 2 is the smallest region used, it also includes the tiles of region 1.

FIG. 2 schematically shows an example of sequencing of the steps of the method for obtaining video chunks, according to one particular embodiment of the invention.

According to this method, in order to decrease the bandwidth required to receive the tiles, the client requests the tiles of region 1 with a high quality level (larger amount of data per tile), and the tiles of region 3 with a low quality level (smaller amount of data per tile). In order to further decrease the necessary bandwidth, the client may in addition request the tiles of region 1 with a higher priority than those of region 3. If the bandwidth is insufficient for all the tiles, those of region 1 will thus be received as a priority.

Viewing a 360-degree video is done chunk by chunk, with the time interval between two chunk displays being set and for example equal to 1 second. The method is described below in detail with respect to display of the tiles in the display window at a display time, and, in parallel with the display, to obtainment of the tiles for the following display time, which is 1 second later. Display and obtainment must therefore be repeated as many times as there are time intervals (i.e. seconds) in the complete video.

Beforehand, the client must obtain from a server information describing the structure of the content to be retrieved, in a step G1. This may for example be an MPD file (MPD being the acronym of Media Presentation Description). This file tells the client how the video sphere is spatially subdivided (number of tiles, position in the video sphere), what levels of encoding quality are available for a tile, etc.

In a step G2, the client processes the information extracted from the file and prepares the display of the very first display window, which is called the current window. For example, the client transmits in separate HTTP/2 streams requests for each of the tiles it needs for this display window.

The following step G3 comprises the steps E1 to E5, and is repeated for each display time, i.e. every second if the time interval between 2 display windows is 1 second as in our example.

In a step E1, the client displays the current window, i.e. the tiles touching the current display window are "played" to the user of the head-mounted display (or "viewed"). In a step E2 that takes place in parallel with step E1, the client estimates the next display window, and transmits requests for the tiles making up this next display window. Step E2 comprises steps F1 to F3 repeated a plurality of times. For example, a first iteration of steps F1 to F3 is executed at the start of the current time interval, then a second iteration is executed 500 ms later, at half the duration of the interval. For the sake of simplicity, the number of iterations is here limited to 2 but a higher number is possible. For a time interval of 1 second and 2 iterations, the duration of each iteration is limited in our example to 500 ms, but any other division of the time interval is possible, provided that the minimum duration necessary for an iteration, which depends on factors such as the computing power of the client, the volume of video data it needs to receive, the effective bandwidth between the client and the video server, etc., is respected.

In a step F1 of the first iteration, the client estimates the position of the display window that is most likely to be observed at the end of the current interval. Any prediction technique may be used, for example one based on the instantaneous position of the head-mounted display, and/or on the trajectory of the head-mounted display, and/or based on information relating to content elements of particular interest located in certain places on the video sphere in the chunks played or still to be played, and/or based on other types of information. By estimating the position of the display window, it is also the limits of each of the regions taken into account (regions 2 and 3) that are estimated.

In a step F2 of the first iteration, the client identifies the tiles of each of the regions taken into account, and associates with each of the tiles an adequate quality level. For example, the high quality level is associated with tiles touching region 2, and the low quality level is associated with tiles touching region 3.

Since this is the first iteration, no tiles for the next display time have yet been requested by the client. In a step F3 of the first iteration, the client then sends to the video server as many tile delivery requests as there are identified tiles. Optionally, the client may include a weight for each of its requests, this weight being proportional to the priority that the client wishes to see given by the server to the delivery of the tile requested in the request. For a tile touching region 2, a high weight is included in the request. On the contrary, for a tile touching region 3, a low weight is included in the request.

For the second iteration, step F1 is repeated identically, 500 ms later than the first time, in our exemplary embodiment with 2 iterations and 1 second per time interval. The new estimate of the display window is highly likely to be better because it is made a shorter time before the end of the interval, i.e. a shorter time before the head-mounted display reaches the position that it will be in at the next display time.

For the second iteration, step F2 is repeated identically, with a potentially different result. The client identifies the tiles of each of the regions, which are determined this time based on the new estimate.

In step F3 of the second iteration, requests to the video server are also sent, but in a different way compared to the first iteration. Specifically, all the necessary tiles have already been required once. However, the new estimation of the display window may make certain quality levels associated with the tiles already required unsuitable.

For example, if a tile previously identified in region 2 is now in region 3, the request to deliver this tile with a high quality level is canceled by sending a request to cancel delivery of this tile, then a new request to deliver this tile with a low quality level is sent. If the response to the request of the previous iteration, with respect to the tile with a high quality level, has already been received, the client however keeps this tile rather than re-requesting delivery of the same tile with a lower quality, in order to preserve the bandwidth between the head-mounted display and the video server.

Conversely, if a tile previously identified in region 3 is now in region 2, the request to deliver this tile with a low quality level is canceled by sending a request to cancel delivery of this tile, then a new request to deliver this tile with a high quality level is sent. Likewise, if the response to the request of the previous iteration, with respect to the tile with a low quality level, has already been received or is on the point of being received but with little remaining bandwidth, the client may however decide to make do therewith, in order to preserve the bandwidth between the head-mounted display and the video server.

A tile that has not changed region with respect to the previous iteration does not give rise to the transmission of a new request, except if the client notices a delay in the delivery of certain important tiles, i.e., typically, tiles of region 2. In this case, the client may decide to review the weight associated with a tile, in order to speed up or slow down its delivery by the server, compared to others tiles. In the event of a change in weight, a request to cancel delivery of the tile is transmitted, followed by a request to deliver this tile with the revised weight.

If, in another embodiment, the number of iterations is higher than 2, steps F1 to F3 of the following iterations are identical to those of the second iteration described above.

HTTP/2 allows management of one stream per tile in a given connection between the head-mounted display and the video server. Also, HTTP/2 allows cancellation of a current request, and the indication in a request of the required quality level and of the desired priority level (using weights).

In a step E3, the client receives tiles from the video server, in response to requests made in steps F3 of step E2. It should be noted that certain of these responses may be received while step E2 has not yet been ended. This step E3 is in fact made up of multiple sub-steps of receiving a tile.

In a step E4, the client determines the display window observed at the end of the current time interval. This window is determined by the instantaneous real position of the head-mounted display, i.e. the position of the user's head, at the end of the time interval. In a step E5, the client decodes the received tiles covering the observed display window, then combines these tiles to build a single video chunk. Certain tiles bordering the display window may be only partially included. Alternatively, the client may decode all the received tiles in order to build as much of the 360-degree video as possible and then extract the portion needed for the observed display window. To be able to build the complete 360-degree video, the tiles of the entire video sphere must be received. To achieve this, it is enough to replace region 3 of this example of implementation of the method with region 4 of FIG. 1, or to add region 4 thereto as a third region, for example with the quality level of region 4 even lower than that of region 3.

Then the observed display window becomes the current display window and the method returns to step E1, in order to process the next time interval. The set of steps E1 to E5 (i.e. step G3 in FIG. 2) is repeated until the last time interval of the 360-degree video.

With reference to FIG. 3, an example of the structure of a device for obtaining video chunks, according to a particular aspect of the invention, is now described.

The attaching device 100 implements the method for obtaining video chunks, various embodiments of which have just been described.

Such a device 100 may be implemented in a head-mounted display HMD1 comprising a screen Scr and a position and movement sensor Pos.

For example, the device 100 comprises a transmitter 101, a receiver 102, a processing unit 130, equipped for example with a microprocessor pP, and controlled by a computer program 110, stored in a memory 120 and implementing the obtaining method according to the invention. The transmitter and receiver may be wireless and use a protocol such as WiFi, BlueTooth, 4G, etc. The device also comprises a decoder 103 of an audiovisual encoding format such as for example HEVC.

On initialization, the code instructions of the computer program 110 are for example loaded into a RAM memory, before being executed by the processor of the processing unit 130.

Such a processing unit 130 is suitable for, and configured with a view to:

- estimating the display window, depending on a prediction of a head-mounted-display orientation capable of being adopted at the display time, for example depending on data relating to the head-mounted display that are transmitted by the sensor (Pos),
- identifying tiles covering the estimated display window, with which tiles is associated a high quality level, and tiles neighboring those covering the estimated display window, with which tiles is associated a low quality level,
- transmitting, using the transmitter 101, to a video server, for at least one of the identified tiles, a request (HTTP/2 req) relating to the obtainment of the encoded tile, the request comprising an indication of the associated quality level,
- repeating, at least once before the display time, the estimation, with a view to correcting the identification of the tiles and correcting requests that are still unanswered,
- receiving, using the receiver 102, from the video server, responses (HTTP/2 rep) to the sent requests, including encoded tiles, determining the display window depending on the observed position of the head-mounted display at the display time, which position is transmitted by the sensor (Pos), decoding, using the decoder 103, the received tiles corresponding to the determined display window, and transmitting them to the screen (Scr) for viewing.

Advantageously, the processing unit 130 is also able to, and configured so as to:

send, using the transmitter 101, to the video server, a request for delivery of a tile further comprising an indication of a priority level associated with the tile, send, using the transmitter 101, to the video server, a request (HTTP/2 req) to cancel delivery of an encoded tile.

The invention claimed is:

1. A method for obtaining video chunks of a video sphere for display in a head-mounted display connected to a video server, the video chunks being spatially divided into a plurality of tiles encodable with at least two different quality levels, including a high quality level and a low quality level, a display window comprising a portion of the video sphere intended to be displayed at a display time, the method comprising, prior to the display time, at least two iterations of the series of following steps:

estimating the display window, based on a prediction of a head-mounted display orientation capable of being adopted at the display time, identifying tiles covering the estimated display window, the tiles covering an estimated display level associated with the high quality level, identifying tiles neighboring the tiles covering the estimated display window, the neighboring tiles associated with the low quality level, transmitting to the video server, for at least one of the identified tiles, a request relating to obtaining the encoded tile, the request comprising an indication of the associated quality level, the method further comprising the following steps:

receiving responses from the video server to the sent requests, the responses comprising encoded tiles, determining the display window at the display time based on an observed position of the head-mounted display, and decoding and displaying the received tiles, corresponding to the determined display window.

2. The method of claim 1, wherein the request further comprises an indication of a priority level associated with the tile.

3. The method of claim 1, wherein, for a first iteration, the request comprises a request to deliver the encoded tile corresponding to the identified tile.

4. The method of claim 2, wherein, for an iteration after the first iteration and if the quality level or priority level associated with the identified tile has changed with respect to the previous iteration into a new quality level or priority level, the request comprises a request to cancel delivery of the encoded tile corresponding to the identified tile, followed by a new request to deliver the encoded tile, comprising the new quality level or the new priority level associated with the identified tile.

5. The method of claim 1, wherein, for an iteration after a first iteration if the quality level associated with the identified tile has decreased with respect to a previous iteration, no new request is sent if the tile has already been received.

6. The method of claim 1, wherein a connection between the head-mounted display and the video server comprises one different stream per identified tile.

7. The method of claim 6, wherein the connection between the head-mounted display and the video server uses an HTTP/2 protocol.

8. A device configured to obtain video chunks of a video sphere for display in a head-mounted display connected to a video server, the video chunks being spatially divided into a plurality of tiles encodable with at least two different quality levels, including a high quality level and a low quality level, a display window comprising a portion of the video sphere intended to be displayed at a display time, the device comprising a receiver, a transmitter, a decoder, a processor, and a memory in communicating with the processor, the memory comprising instructions that are intended to be executed by the processor, the device configured to:

estimate the display window, based on a prediction of a head-mounted-display orientation capable of being adopted at the display time, identify tiles covering the estimated display window, the tiles covering an estimated display level associated with the high quality level, and tiles neighboring the tiles covering the estimated display window, the neighboring tiles associated with the low quality level, transmit, to the video server, for at least one of the identified tiles, a request relating to obtaining of obtaining the encoded tile, the request comprising an indication of the associated quality level, repeat, at least once before the display time, the estimation of the display window, to correct the identification of the tiles and correct requests that are still unanswered, receive responses from the video server to the sent requests, the requests comprising encoded tiles, determine the display window at the display time based on an observed position of the head-mounted display, and decode and display received tiles, corresponding to the determined display window.

9. A head-mounted display comprising:
the device of claim 8,
a position and movement sensor, and
a screen.

10. A non-transitory computer readable storage medium having stored thereon instructions which, when executed by a processor, cause the processor to implement the method of claim 1.

* * * * *